United States Patent [19]

Tamae et al.

[11] Patent Number: 4,818,908
[45] Date of Patent: Apr. 4, 1989

[54] BRUSHLESS MOTOR HAVING PHASE ADVANCE

[75] Inventors: Hiroaki Tamae, Hirakata; Yoshihiro Ashizaki, Katano, both of Japan

[73] Assignee: Matsushita Electric Industrial Co., Ltd., Kadoma, Japan

[21] Appl. No.: 49,319

[22] PCT Filed: Dec. 10, 1985

[86] PCT No.: PCT/JP85/00679

§ 371 Date: Jun. 7, 1987

§ 102(e) Date: Jun. 7, 1987

[87] PCT Pub. No.: WO87/01251

PCT Pub. Date: Feb. 26, 1987

[30] Foreign Application Priority Data

Aug. 12, 1985 [JP] Japan ................................. 60-177121

[51] Int. Cl.⁴ ........................................... H02K 29/06
[52] U.S. Cl. ..................................... 310/171; 318/138
[58] Field of Search ..................... 310/49 R, 154, 162, 310/268; 318/685, 696, 133; 360/77

[56] References Cited

U.S. PATENT DOCUMENTS

| | | | |
|---|---|---|---|
| 3,293,459 | 12/1966 | Kreuter et al. | 310/49 R |
| 4,246,518 | 1/1981 | Kögler et al. | 318/138 |
| 4,306,164 | 12/1981 | Itoh et al. | 310/49 R |
| 4,353,016 | 10/1982 | Born | 318/138 |
| 4,390,826 | 6/1983 | Erdman et al. | 318/138 |
| 4,509,001 | 4/1985 | Wakabayashi et al. | 318/687 |
| 4,546,293 | 10/1985 | Peterson et al. | 318/254 |
| 4,591,774 | 5/1986 | Ferris et al. | 318/696 |
| 4,618,808 | 10/1986 | Ish-Shalom et al. | 318/696 |
| 4,686,437 | 8/1987 | Langley et al. | 318/138 |
| 4,692,676 | 9/1987 | Dohi et al. | 318/254 |
| 4,717,864 | 1/1988 | Fultz | 318/138 |

FOREIGN PATENT DOCUMENTS

| | | |
|---|---|---|
| 0066159 | 12/1982 | European Pat. Off. . |
| 2527744 | 1/1976 | Fed. Rep. of Germany . |
| 2620935 | 1/1978 | Fed. Rep. of Germany . |
| 2807655 | 9/1978 | Fed. Rep. of Germany . |
| 3924414 | 8/1939 | Japan . |
| 54-57111 | 5/1979 | Japan . |
| 54-199498 | 12/1982 | Japan . |

Primary Examiner—Patrick R. Salce
Assistant Examiner—D. L. Rebsch
Attorney, Agent, or Firm—Cushman, Darby & Cushman

[57] ABSTRACT

A Brushless motor with phase advance has a rotor having magnetic poll teeth, a stator having plural coils and facing the rotor across a gap, and a bearing for rotatably supporting the rotor. A position sensor is mounted on the stator and detects variations in the position of the rotor and converts said variations into an electrical signal which issues as a polyphase positional signal having an approximate sine-wave shape. A velocity detecting device converts the positional signal into a velocity signal. Electronic switching apparatus receives a step advance instruction signal from outside the motor and selects the polyphase positional signal corresponding to the step advance instruction signal. Phase advance circuitry advances the phase of the positional signal by using a sum of the velocity and the selected positional signal as the phase advance amount.

5 Claims, 18 Drawing Sheets (a)

(b)

(a)

(b)

(c)

(d)

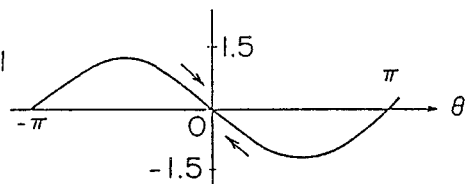
FIG. 13 (a) $K_2\beta = 1$
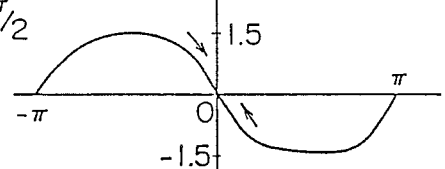
FIG. 13 (b) $K_2\beta = \pi/2$
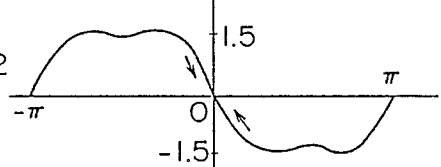
FIG. 13 (c) $K_2\beta = 2$
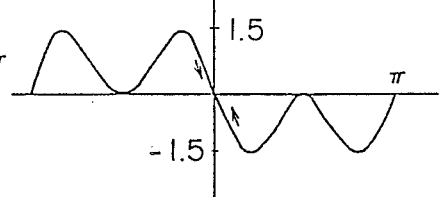
FIG. 13 (d) $K_2\beta = \pi$ (a)

(b)

FIG. 17 is a sectional view of a motor part of a fourth embodiment of the present invention, and FIG. 18 is a sectional view taken along line A—A' of FIG. 17.

DETAILED DESCRIPTION OF THE PREFERRED EMBODIMENT

A brushless motor according to a first embodiment of the present invention is described as follows referring to the FIGURES.

FIG. 1 is a diagram for describing a principle of a mechanical part of the brushless motor of the first embodiment of the present invention, and shows a linear development of the motor.

Stator core 1 comprises a core 1a having magnetic pole teeth groups A, B and C, and a core 1b having magnetic pole teeth groups $\overline{A}$, $\overline{B}$ and $\overline{C}$. Coil 2 is wound on the magnetic pole teeth groups of the stator core 1, and permanent magnet 3 is disposed between the cores 1a and 1b. Rotor core 4 has magnetic pole teeth of plural concavities and convexities of a constant angular pitch. The magnetic pole teeth groups A, B and C of the stator core are respectively shifted by O pitch, L/3 pitch and −L/3 pitch with respect to the magnetic pole teeth (pitch L) of the rotor core 4, and the magnetic pole teeth groups $\overline{A}$, $\overline{B}$ and $\overline{C}$ are respectively shifted by L/2, L/2+L/2=L/3 and L/2−L/3 with respect to the pole teeth of rotor core 4. Thus, the variation of permeance of each magnetic teeth group can be treated as a sine wave by adjusting the teeth shapes and is represented by:

$PA = PO + p \cdot \cos \theta$ $PB = PO + p \cdot \cos (\theta - 120°)$ $PC = PO + p \cdot \cos (\theta - 240°)$ $P\overline{A} = PO - p \cdot \cos \theta$ $P\overline{B} = PO - p \cdot \cos (\theta - 120°)$ $P\overline{C} = PO - p \cdot \cos (\theta - 240°)$ $PO = (P_{max} + P_{min})/2$ $P = (P_{max} - P_{min})/2$ where
$P_{max}$: When the teeth face each other and
$P_{min}$: When the teeth do not face each other, and $\theta = 2\pi(x/l)$.

The magnetic fluxes generated by the permanent magnet are shown as follows:

$\phi MA = \left(1 + \dfrac{P}{PO} \cdot \cos\theta \right)\phi M$ $\phi MB = \left(1 + \dfrac{P}{PO} \cdot \cos(\theta - 120°) \right)\phi M$ $\phi MC = \left(1 + \dfrac{P}{PO} \cdot \cos(\theta - 240°) \right)\phi M$ $\phi M\overline{A} = \left(1 - \dfrac{P}{PO} \cdot \cos\theta \right)\phi M$ -continued $\phi M\overline{B} = \left(1 - \dfrac{P}{PO} \cdot \cos(\theta - 120°) \right)\phi M$ $\phi M\overline{C} = \left(1 - \dfrac{P}{PO} \cdot \cos(\theta - 240°) \right)\phi M$ where $3\phi M$: average magnetic flux generated by the permanent magnet.

When a brushless motor with an ordinary sine wave drive is used, currents are selected as follows:

$IA = IO \cdot \sin \theta$ $IB = IO \cdot \sin (\theta - 120°)$ $IC = IO \cdot \sin (\theta - 240°)$ $\overline{IA} = -IO \cdot \sin \theta$ $\overline{IB} = -IO \cdot \sin (\theta - 120°)$ $\overline{IC} = -IO \cdot \sin (\theta - 240°)$ The magnetic fluxes generated by the coil 2 are as follows:

$\phi CA = -NPAIA \qquad \phi C\overline{A} = -NP\overline{A}\overline{IA}$ $\phi CB = -NPBIB \qquad \phi C\overline{B} = -NP\overline{B}\overline{IB}$ $\phi CC = -NPCIC \qquad \phi C\overline{C} = -NP\overline{C}\overline{IC}$ wherein N: coil winding number of one magnetic pole teeth group.

The magnetic flux of each phase is the sum of $\phi M$ and $\phi C$.

$\phi A = PA\left(\dfrac{\phi M}{PO} - NIA\right) \qquad \phi\overline{A} = P\overline{A}\left(\dfrac{\phi M}{PO} - N\overline{IA}\right)$ $\phi B = PB\left(\dfrac{\phi M}{PO} - NIB\right) \qquad \phi\overline{B} = P\overline{B}\left(\dfrac{\phi M}{PO} - N\overline{IB}\right)$ $\phi C = PC\left(\dfrac{\phi M}{PO} - NIC\right) \qquad \phi\overline{C} = P\overline{C}\left(\dfrac{\phi M}{PO} - N\overline{IC}\right)$ On the other hand, variations of reluctance are as follows:

$RA = RO - \gamma \cdot \cos \theta$ $RB = RO - \gamma \cdot \cos (\theta - 120°)$ $RC = RO - \gamma \cdot \cos (\theta - 240°)$ $R\overline{A} = RO + \gamma \cdot \cos \theta$ $R\overline{B} = RO + q \cdot \cos (\theta - 120°)$ $R\overline{C} = RO + \gamma \cdot \cos (\theta - 240°)$ $RO = (R_{max} + R_{min})/2$ $\gamma = (R_{max} - R_{min})/2$, wherein R min: when the teeth face each other
R max: when the teeth do not face each other.

BRUSHLESS MOTOR HAVING PHASE ADVANCE

TECHNICAL FIELD

The present invention relates to a brushless motor capable of positioning operations and high-speed rotation.

BACKGROUND OF THE INVENTION

Responding to the development of recent semiconductor technology and digital technology, industrial apparatuses are making increased use of microcomputers. As a driving source for such apparatuses, a motor capable of digital positioning operations is useful, and hitherto a stepping motor or a servo motor has been used.

However, the stepping motor is not suitable for high-speed rotation since the increase of current is delayed at high-speed, and since the torque it not timely generated because of the influence of iron loss and the time constant of the coil. Particularly when the magnetic pole pitch is made small in order to improve the positional resulution capability, the iron loss influence appears, since the switching frequency per one rotation is increased.

Further, in order to compensate the disadvantages of the stepping motor, there is a method that can be executed where an encoder is provided outside the motor and switching of the conducting phase is carried out at an advanced time corresponding to the motor speed to thereby overcome the delay of the current increasing. However, in this method, there is the disadvantage that the size of the apparatus becomes large because the encoder is provided outside of the motor, and the encoder is expensive.

On the other hand, in the case of the positioning servo system, high-speed running is executed corresponding to digital position instructions, and therefore proper positioning characteristics can be obtained. However, even in such systems there are disadvantages, such as the encoder being expensive and the circuit scale of the control system being large and expensive.

As described above, the stepping motor is incapable of high-speed rotation, and the stepping motor provided with an encoder has the disadvantages of large size and an expensive encoder. Further, the servo motor has the disadvantage of using an expensive control system and an expensive encoder.

In view of the above-mentioned problems, the present invention offers a brushless motor having positioning functions and high-speed rotation characteristics with a size corresponding to the conventional stepping motor size, and considerably simpler circuit construction.

SUMMARY OF THE INVENTION

In order to overcome the above problems, the brushless motor of the present invention comprises (a) a rotor having a magnetic body or a permanent magnet, (b) a stator comprising at least a stator core facing the rotor across an air gap, and plural coils, (c) a bearing for rotatably supporting the rotor, (d) a position sensor, mounted on the stator, for detecting the variation of the position of the rotor and converting it to electric signals thereby issuing positional signals of almost sine waves of different phase to each other, (e) velocity detecting means for converting the variation of the positional signals to velocity signals, (f) electronic switching means for receiving step advance instruction signals from outside and selecting polyphase positional signals in order depending on the number of the step advance instruction signal, (g) phase advance means for advancing the phase of the positional signal by an advancing amount of the sum of the velocity signal and the selected positional signal, (h) a driving circuit for exciting plural coils by the advanced positional signal.

By the above construction, the present invention provides a brushless motor that provides, with regard to the position signal being obtained by the position sensor built in the motor, a positional signal for phase switching which is phase-advanced corresponding to the positional signal itself selected by the electric switching means, and wherein the step advance function and positioning function are obtained by exciting the coil by the phase-advanced positional signal. Further, the delay of the current increase is overcome by wholly increasing the phase-advance amount of the positional signal corresponding to the velocity by adding the velocity signal to the phase-advance instruction amount and thereby provide high-speed rotation.

BRIEF DESCRIPTION OF THE DRAWINGS

FIG. 13 is a diagram showing the torque distribution of the second embodiment.

$$F_i = -\tfrac{1}{2}\phi i^2 \frac{dR_i}{dx}$$

$$(i = A, C, \overline{A}, \overline{B}, \overline{C})$$

and the whole thrust force is $$F = \Sigma F_i = \frac{2\pi(NIO)B_m S_m}{L} \cdot m \quad M = \frac{P}{PO}, \text{ wherein}$$

$B_m$: permanent magnet operation point
$S_m$: permanent magnet sectional area, and when a brushless motor of ordinary sine drive is used, theoretically the operation has no cogging or torque ripple.

Figure 1:
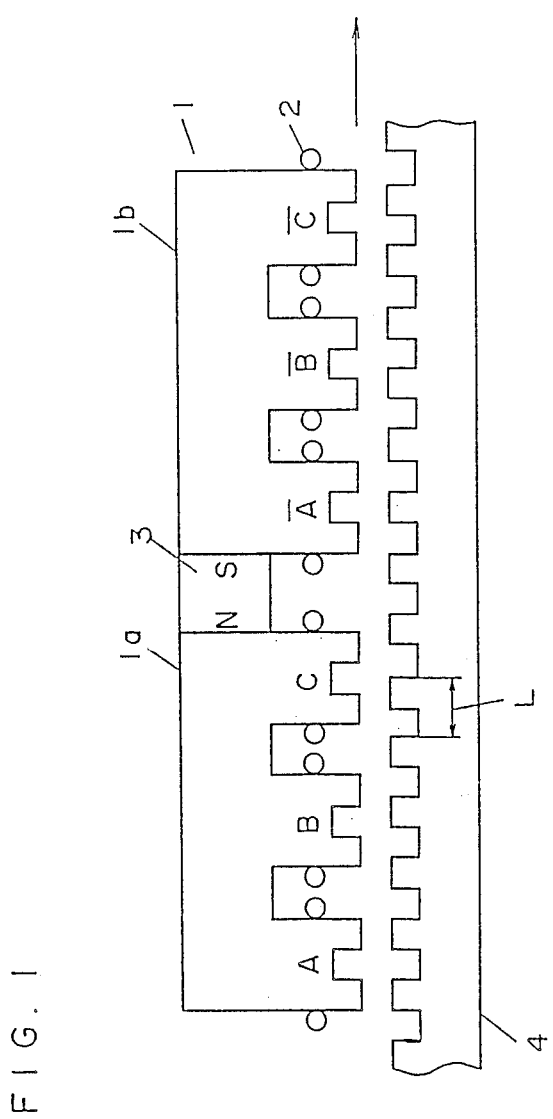
FIG. 1 is a diagram for describing a principle of a first embodiment of the present invention.
Figure 2:
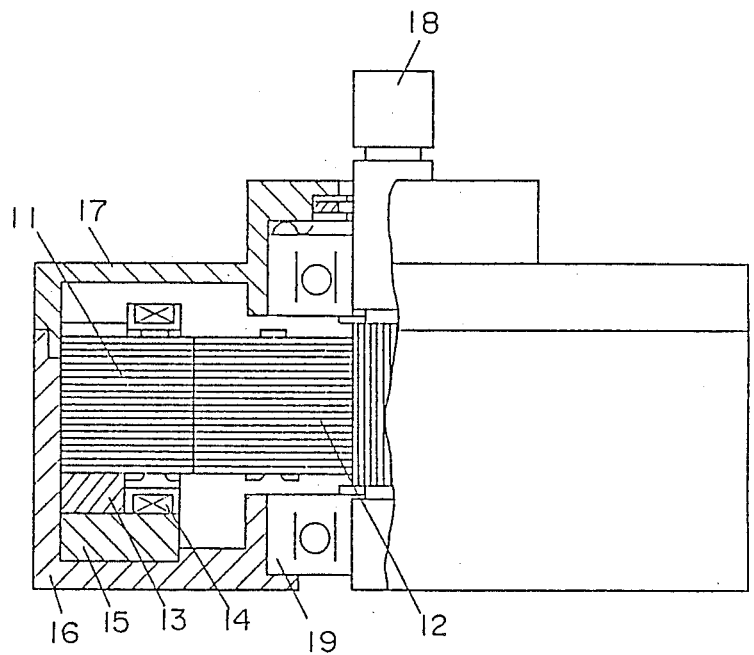
FIG. 2 is a sectional view of a motor mechanical part of the first embodiment.
Figure 3:
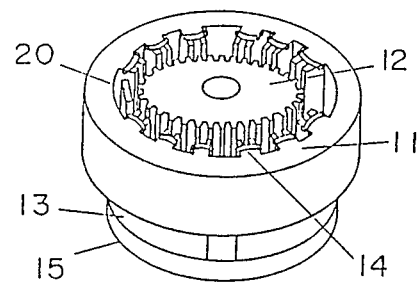
FIGS. 3(a) and 3(b) are respectively a perspective view and a sectional view showing the attachment of a position sensor of the first embodiment.
Figure 3:
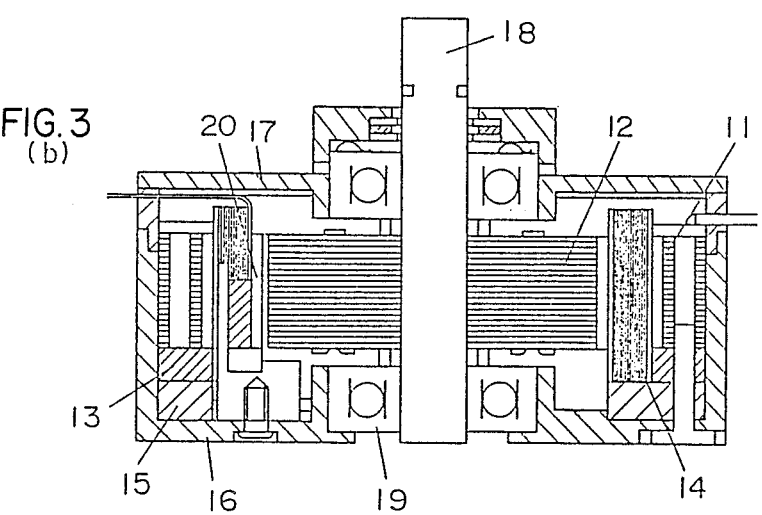

FIG. 2 is a sectional view of a mechanical part of the brushless motor of the first embodiment of the present invention, and FIG. 3 is a sectional view showing the attachment of a portion sensor.

A rotor core 12 having teeth at the same angular pitches on its external periphery is press-mounted on a shaft 18 and is mounted in a case 16 and 17 by a bearing 19. On the other hand, the stator core 11 is wound by a coil 14 and is attached by a permanent magnet 13 and is fixed to the case 16 through a yoke 15. Further, a non-touch sensor 20 is fixed to the case 16 and is disposed across a minute gap from the external periphery of the rotor core 12. The position sensor 20 detects the concavities and convexities of the teeth of the rotor core 12 by magnetic means or optical means. This is converted to electrical signals to obtain positional signals approximating sine waves.

Figure 4:
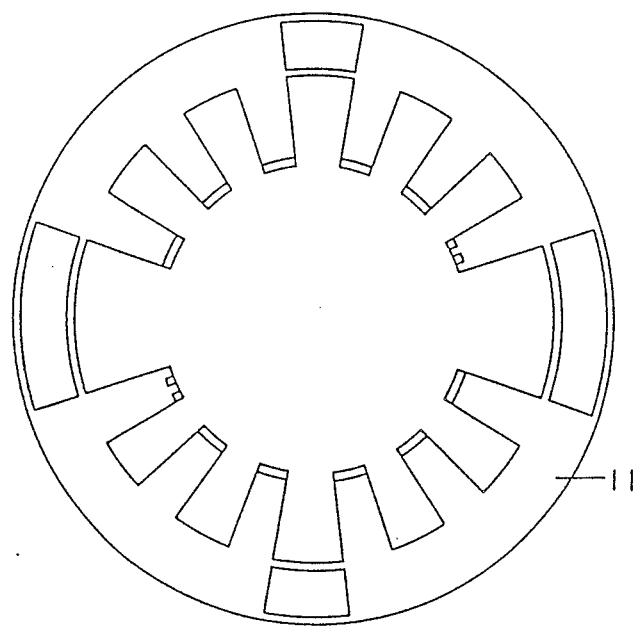
FIG. 4 is a plan view of a stator core of the first embodiment.
Figure 5:
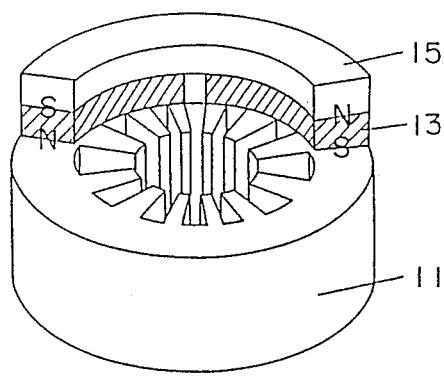
FIGS. 5(a) to 5(d) are perspective views showing the attachment of a magnet to the stator core of the first embodiment.
Figure 5:
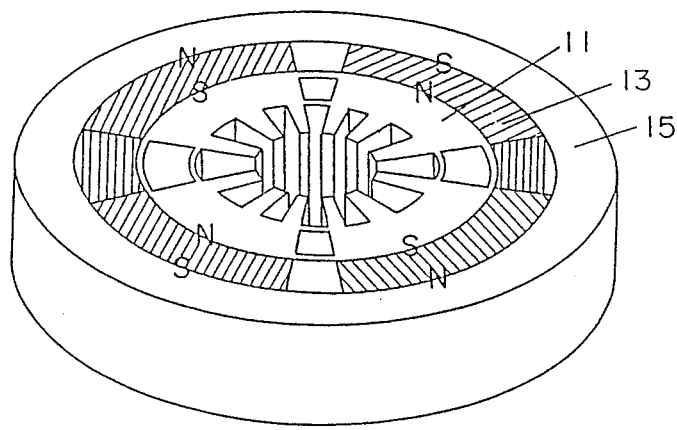
Figure 5:
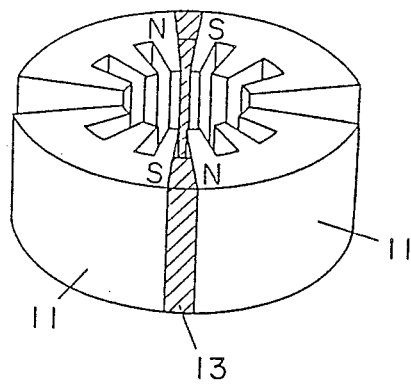
Figure 5:
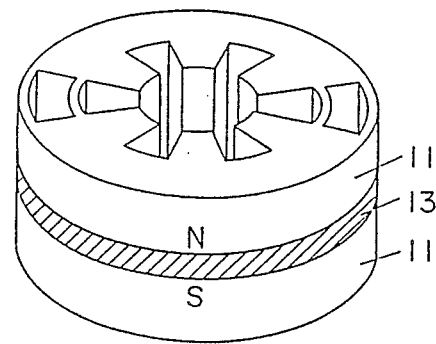

The configuration of the stator core 11 is shown in FIG. 4. The stator core 11 has a fundamental unit comprising six magnetic pole teeth groups which are respectively different in phase from the magnetic pole teeth formed on the whole circumference of the external periphery of the rotor core 12. Naturally, magnetic pole teeth groups of plural fundamental units can be disposed within the same stator.

Figure 6:
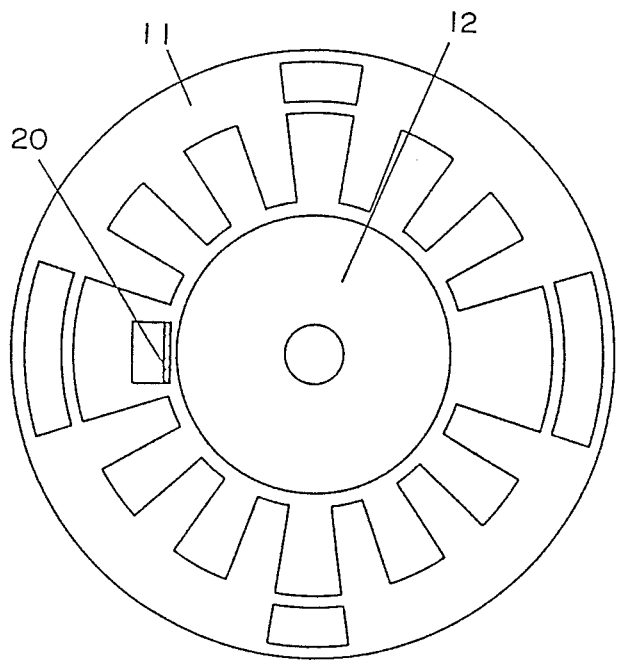
FIG. 6 is a diagram showing attaching position of the non-touch sensor to the stator core of the first embodiment.

FIGS. 5(a)–5(d) show attachment methods for the stator core and the magnet. There are such methods as: (a) mounting the permanent magnet 3 between the stator core 11 and the yoke 15 which are disposed in an axial direction, (b) mounting the permanent magnet 3 between the stator core 11 and the yoke 15 which are disposed in a radial direction, (c) mounting the permanent magnet 13 in the stator core 11 which is divided in a diameter direction, and (d) mounting the permanent magnet 13 in the stator core 11 which divided into two parts in an axial direction. The position sensor 20 is disposed between the magnetic pole teeth groups of the stator core 11 as shown in FIG. 6.

Figure 7:
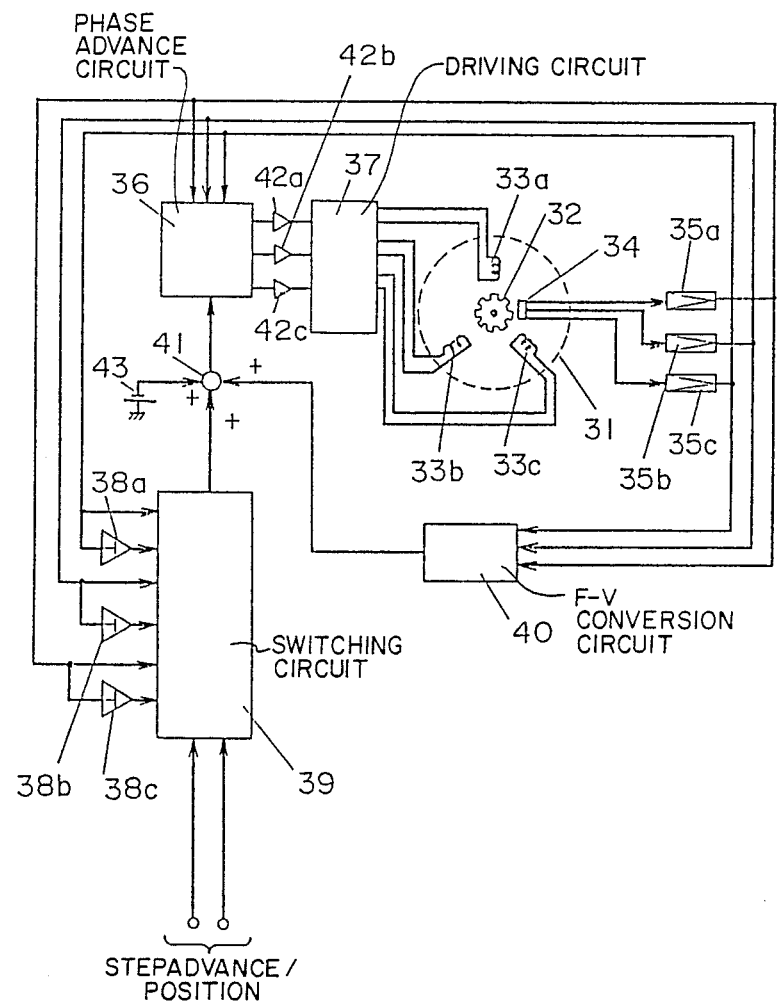
FIG. 7 is a block diagram of an electric circuit of the first embodiment.

FIG. 7 is a block diagram of an electric circuit of the brushless motor of the first embodiment of the present invention.

In FIG. 7, mechanical part 31 is a part of the above-mentioned motor, 32 is the rotor, 33a, 33b and 33c are three phase coils, and 34 is the position sensor comprising a magnetic reluctance element, and so on. Positional signal amplifiers 35a, 35b and 35c respectively amplify the three phase positional signal output of the above-mentioned position sensor 34.

Phase advance circuit 36 advances the phase of the three phase positional signal corresponding to a phase advance instruction amount. Driving circuit 37 of three phase, full-wave type provides a rectangular wave which makes current flow through the three phase motor coil corresponding to the variation of polarity of the phase-advanced positional signal. Amplifiers 38a, 38b and 38c reverse the three phase positional signal. Electronic switching circuit 38 receives a step advance instruction signal from outside and selects one signal among the six total positional signals and reversed positional signals. Frequency-voltage conversion (FV conversion) circuit 40 converts a variation of the positional signal to a velocity signal, and 41 is an adder. Rectangular-shaping circuits 42a, 42b, and 42c shape the positional signal, and 43 is an advance phase bias voltage.

The operation of the brushless motor described above is as follows.

Figure 8:
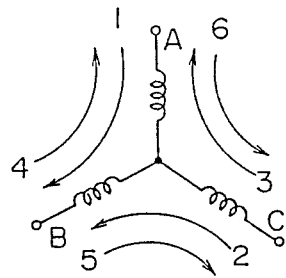
FIGS. 8(a) to 8(d) are diagrams showing coil connections and motor torque distribution for the first embodiment of the present invention.
Figure 8:
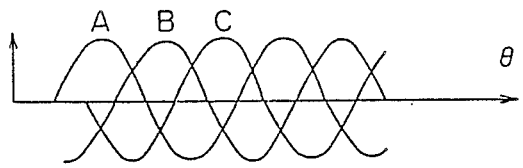
Figure 8:
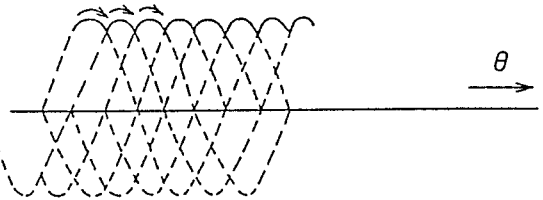
Figure 8:
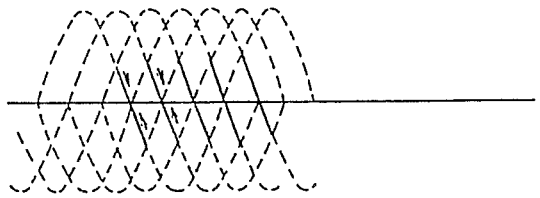

FIG. 8 shows a coil connection diagram of the brushless motor of the first embodiment and the torque distribution of the motor. In FIG. 8(a), a certain current flows through the coil, being switched as (1)–(6). When the space magnetic flux density and the reluctance of the air gap between the stator and the rotor distribute in sine wave form with respect to the rotary angle, as FIG. 8(b) each phase torque distributes in sine wave form of a period of the magnetic pole teeth pitch $\tau$ of the rotor with respect to the rotary angle.

In an ordinary brushless motor, such continual torque as FIG. 8(c) is obtained by adjusting the phase of the position sensor for detecting the position of the rotor. However, in the brushless motor of the present invention, the position of the position sensor is adjusted so as to obtain the torque distribution as shown in FIG. 8(d). By electrifying the apparatus in such a way, the rotor does not rotate and is maintained at the position determined by the conducted current phase, and thereby proper positioning characteristics are achieved.

Figure 9:
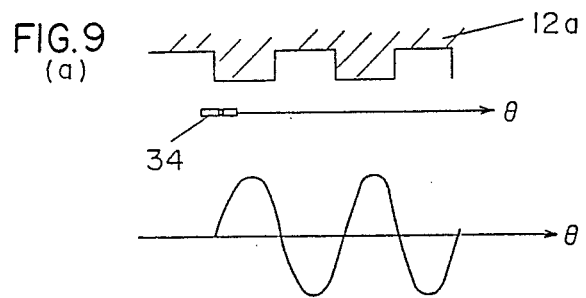
FIGS. 9(a) to 9(e) are diagrams for describing the sensor position of the first embodiment.
Figure 9:
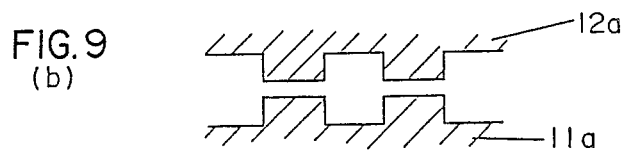
Figure 9:
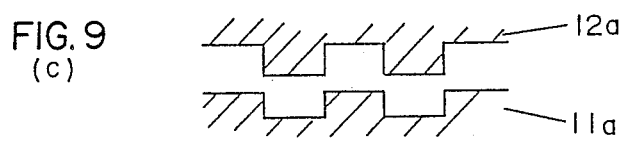
Figure 9:
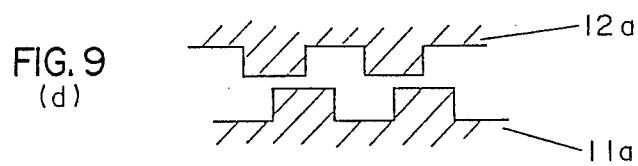
Figure 9:
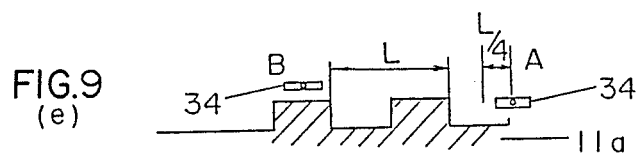

First, with regard to one fundamental phase, the relation of the sensor signal, the rotor and the torque distribution is described by using FIG. 9. When a magnetic reluctance element is used as the position sensor 34, the sensor output approximates a sine wave form, as in FIG. 9(a), corresponding to the variation in magnetic reluctance. When the positional relation of the stator magnetic pole teeth 11a and the rotor magnetic pole teeth 12a is as shown in FIG. 9(b), it represents a stable point when the attraction force operates and the torque is 0. FIG. 9(c) represents the stable point when the repulsion force operates and the torque is 0.

The positional relation of teeth when the torque is at maximum is as shown in FIG. 9(d). When the attraction force operates, a rotary torque is generated on the rotor in the right-hand direction, and when the repulsion force operates, a rotary torque is generated on the rotor in the left-hand direction.

When the coil current is switched ON or OFF corresponding to the polarity of the sensor signal, the sensor is disposed in such a manner that the center of an element of one phase component of the position sensor is $\tfrac{1}{4}$ pitch shifted from the center of the cavity and the convexity of the stator magnetic pole teeth, as shown at A in FIG. 9(e).

In order to obtain the positioning characteristics of the brushless motor of the present invention, the center of the conductive period is to be disposed when there exists the relationships shown in FIG. 9(b) and FIG. 9(c), and therefore, the center of the sensor element of the one phase component of the position sensor and the center of the concavity and the convexity of the stator magnetic pole teeth coincides as shown at B in FIG. 9(e).

At that time, the generated torque of each phase and the sensor output of each phase are in the relationship of ¼ pitch shifted.

The phase advance circuit 36 is a circuit for advancing or delaying the phase of the three phase sensor signal of the approximate sine wave signal responding to the phase advance instruction voltage, and is executed by a method of vector-adding of the sensor signal or a method of multiplying the sensor signal by a reference signal which varies as a sine wave value according to an instruction amount. The sensor signal is provided to the phase advance circuit 36 as a signal for phase excitation, and is also used for the phase advance instruction at the same time.

As in FIG. 8, the three phase sensor signals are respectively reversed and the 6 signals in total are applied to the electronic switching circuit 39.

Figure 10:
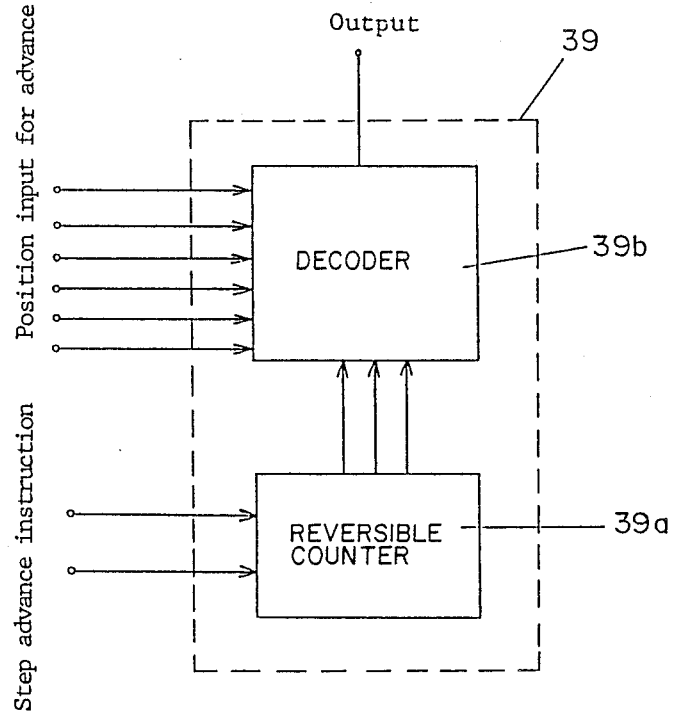
FIG. 10 is a diagram of the electronic switching means of the first embodiment.

The electronic switching circuit 39 comprises, as shown in FIG. 10, a reversible counter 39a of six step advance, and decoder 39b which selects one among the six signals by the output of the counter.

According to this construction, six positional signals are reversibly and orderly selected also with respect to the step advance instruction of both directions.

The FV conversion circuit 40 is a circuit for generating a voltage corresponding to the velocity from the variation of the sensor signal, and that is mainly comprised of differential circuit.

Figure 11:
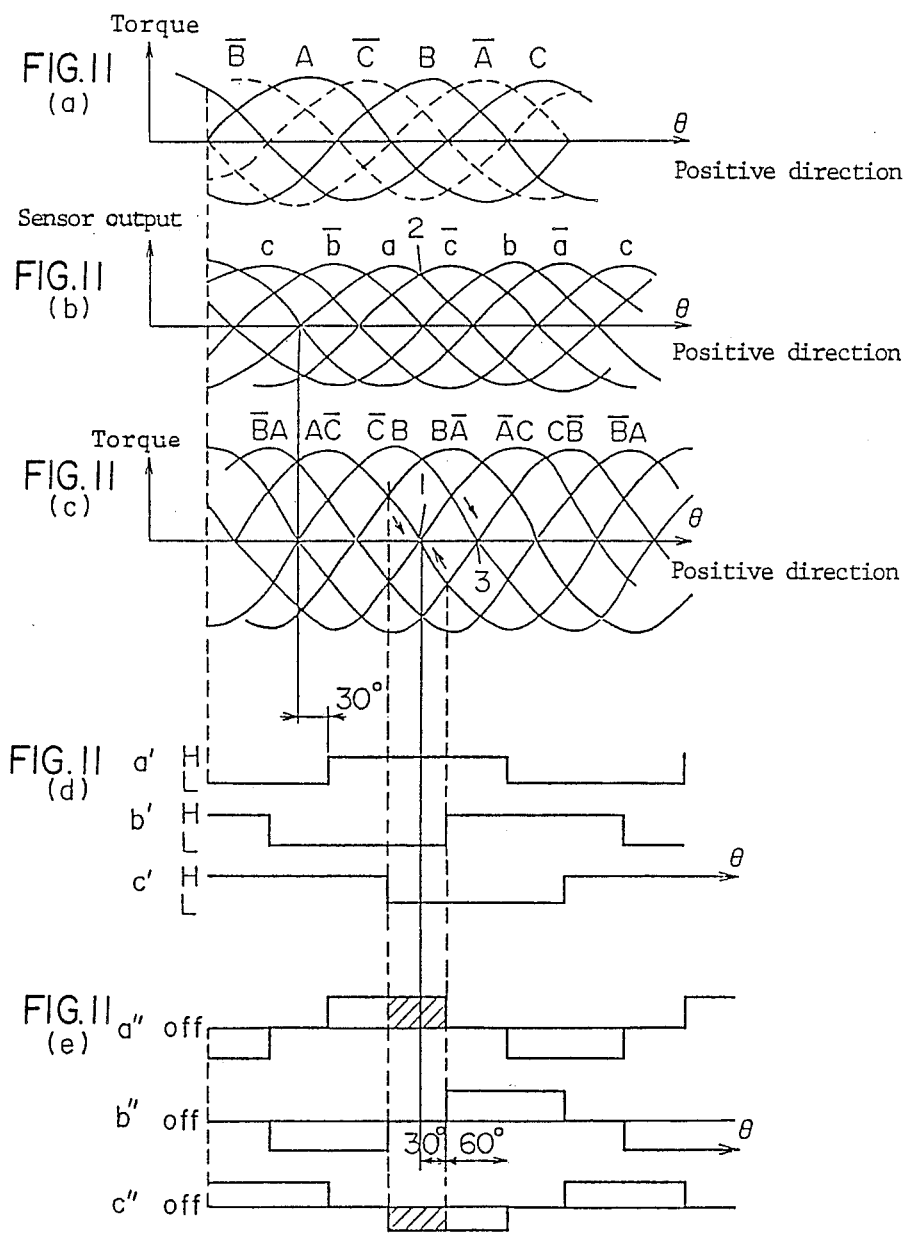
FIG. 11 is a diagram showing the torque distribution for the step advance operation of the first embodiment.

The operation of the brushless motor of the present invention, when the interval between the pulse instructions from outside is long and the velocity voltage can be almost neglected, is disclosed with reference to FIG. 11.

FIG. 11(a) shows the torque distribution when a certain current flows through the three phase coils A, B and C.

FIG. 11(b) shows the output signal of each sensor disposed at the center of the stator magnetic pole teeth concavity and convexity. As mentioned above, the torque distribution and the output wave forms of the sensor are shifted by ¼ pitch with respect to each other. FIG. 11(c) is the torque distribution of each excitation mode for a three phase, full-wave driving of the connection, as shown in FIG. 8(a), and is of a composite value of two respective phases. The sensor signal lags by 30° (T/12) of the electric angle when the velocity is 0 on bias voltage, and is wave-formed by the rectangular-shaping circuit 42a, 42b and 42c, and is shown as FIG. 11(d). This signal is applied to the driving circuit, and the wave as shown in FIG. 11(d) for determining the conductive direction and period of each phase coil by an inner logic circuit, is composed, and the coil current flows corresponding to this.

The apparatus is designed so that when excitation is executed in such a manner that the torque of AC is generated, at the stable point (1) of FIG. 11(c), the positional signal b̄ of FIG. 11(b) is selected by the electronic switch circuit 39. Under such a condition, when there is no step advance instruction from outside, the motor maintains the same position by the torque curve of AC. When the electronic switch selects the sensor signal b̄→a→c̄→b→ā→c→5 is turn corresponding to one pulse by one pulse inputtings of the positive direction step advance pulses, the sensor signal for the advance phase is switched to (a) upon inputting of one pulse of the positive direction instruction at the stable condition when the above-mentioned (b) is selected, and the position voltage at the point (2) on (a) of FIG. (b) is issued as the phase advance instruction. By determining the voltage-phase advance angle coefficient of the phase advancing circuit 36 in a manner that the sensor signal for phase switching leads by a phase of an electric angle of 30° or more and 90° or less by the voltage of point (2), the phase excitation of the coil is switched to CB and the positive direction torque is generated and the rotor starts to move in a positive direction. However, since the level of the sensor signal (a) for phase advance lowers corresponding to the rotation and the amount of phase advance of the sensor signal for phase switching also decreases, the switching to B̄A of the next excitation mode is not executed and stability is obtained as shown at (3) of FIG. 11(c) in compliance to the torque distribution of CB. The phase advance amount by the sensor output (a) is 0 at the stable point (3).

Under such a condition, the sensor signal (c̄) for the phase advance is selected when the next positive direction instruction pulse enters, and likewise the transfer to the next stable point is executed. When one pulse of the reverse direction instruction pulse enters under the condition of FIG. 11(c) (2), the output of the six step advance counter in the electronic switch 39 returns to the last status and the sensor signal (b̄) for phase advance is selected.

At this time, since the level of (b̄) is negative, the sensor signal for phase switching lags and the AC mode is selected, and thereby the reverse direction torque operates and stability is made at point (1).

As mentioned above, the rotation in the instruction direction is executed by one step corresponding to the step advance pulse from outside.

Next, when the interval between the step advance instruction from outside becomes short and when the speed of the rotor increases corresponding to it, the output voltage of the FV conversion circuit 40 becomes large, and this velocity voltage is added to the positional voltage for phase advance by the adder 41; and the phase advance amount of the sensor signal for phase excitation becomes larger than the case of slow speed. By adequately adjusting the level of the FV conversion output, continuous torque which is near the peak point of the torque distribution of FIG. 11(c) like the ordinary brushless motor is generated, and furthermore, by switching the coil excitation earlier by the phase advancing the delay of the coil current increase accompanying the increase of the switching frequency is overcome, and thereby high speed operation can be executed.

As mentioned above, according to the first embodiment, by disposing the rotor comprising a magnetic body having magnetic pole teeth carved at a certain pitch on the circumference, the stator having the permanent magnet, polyphase coil and the stator core that has magnetic pole teeth groups, the position sensor for detecting the concavities and the convexities of the magnetic pole of the rotor and issuing an approximate sine wave-form positional signal, the velocity detecting means, the electronic switching means, the phase advancing means and the driving circuit, a brushless motor having the step advance function and the positioning function and being capable of rotation at high speed in a compact and low price structure can be realized.

A second embodiment will now be described referring to the drawings as follows.

Figure 12:
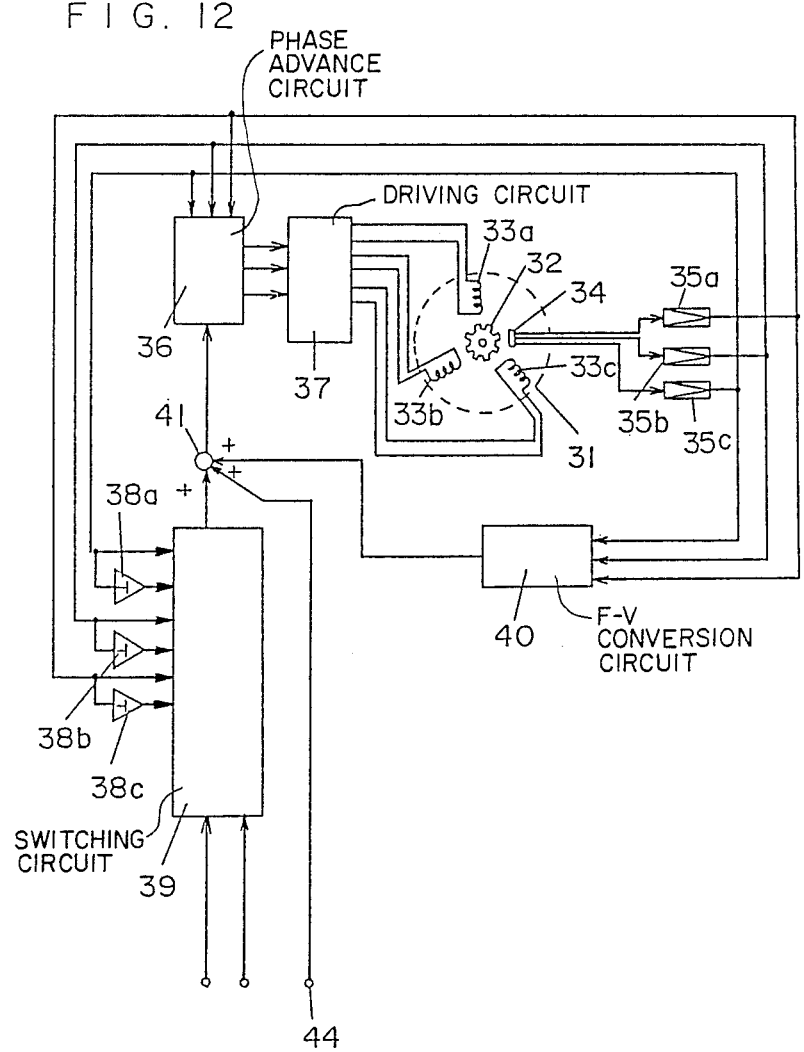
FIG. 12 is a block diagram showing an electric circuit of a second embodiment of the present invention.

FIG. 12 is a block diagram of the electric circuit of the brushless motor of the second embodiment of the present invention.

The difference between the second embodiment and the embodiment shown in FIG. 7 is that the rectangular wave shaping circuit and the phase advance bias voltage are omitted and the driving circuit 37 is constructed as a sine wave driving circuit of the three-phase, full wave type, and further, a position fine control input terminal 44 is provided.

In the sine wave driving circuit, since approximate sine wave-form current flows through the coil corresponding to the output of the position sensor 34, torque is represented by the next formula, provided that the spatial distribution of the magnetic flux within the gap between facing surfaces of the rotor and the stator is a sine wave.

$$T = K_1 \left\{ \sin\theta \times \sin\left(\theta - \frac{\pi}{2} + a\right) + \sin\left(\theta \frac{2}{3}\pi\right) \right.$$

$$\sin\left(\theta - \frac{\pi}{2} 3\frac{2}{3}\pi + a\right) + \sin\left(\theta - \frac{4}{3}\pi\right) \times$$

$$\left. \sin\left(\theta - \frac{\pi}{2} - \frac{4}{3}\pi + a\right) \right\} = \frac{4}{3} K_1 \cdot \sin a$$

T: torque
$\theta$: relative angle (electric angle) of a rotor and a stator
$a$: advance phase angle of a positional signal
$K_1$: contant The case of the ordinary brushless motor generating a continual torque corresponds to the case of $a=\pi/2$ and $T=1.5\, K_1$, and a constant torque having no ripple is obtained on a sine wave driving.

In the present invention, the phase of the position signal is advanced by the signal of the sensor itself by the construction shown in FIG. 7 or FIG. 12. In this embodiment, the phase advance amount is issued from the electronic switch 39 and the phase advance instruction voltage is given by:

$V_s = -K_2 \cdot \sin$,
$K_2$: constant (peak value of sensor signal).

The phase advance circuit 36 receives the instruction voltage and advances the phase of the three phase positional signal by
$a = -K_2 \cdot \beta \cdot \sin\theta$ on the whole.
$\beta$ = coefficient of the phase advance circuit.

Therefore, the torque distribution of the second embodiment of the present invention becomes $T=3/2 K_1 \cdot \sin(-K_2 \cdot \beta \cdot \sin)$. The curve is shown in FIG. 13 and it is derived such that the distribution form varies corresponding to the value of $K_2\beta$.

T-$\theta$ characteristics near the stable point under $K_2\beta \approx 1$ is almost equal to the case when the torque is a sine wave distribution.

When the $K_2\beta$ becomes large, the torque inclination near the stable point becomes larger than the sine wave distribution, and larger T-$\theta$ characteristics are arbitrarily obtainable in comparison with a brushless motor or usual stepping motor, where the torque distribution near the stable point approximates a certain sine wave form, and the positioning accuracy can be made superior when there are various disturbances.

When an arbitrary phase advance instruction voltage $K_3$ is applied from the position fine control signal input terminal 44, the phase advance instruction signal becomes $V_s = (K_3 - K_2 \sin\theta)$, and the torque distribution becomes $T=(3/2)K_1 \cdot \sin(-K_2\beta \cdot \sin + K_3\theta)$, and it achieves a distribution of shifted phase from the torque distribution, as mentioned above, where there is not position fine control input.

Therefore, the stable point of zero torque, namely, a stop position of the rotor can be continually and arbitrarily varied by the position fine control input value.

As mentioned above, in the second embodiment of the present invention, the three phase, full wave, rectangular wave driving circuit of the first embodiment is constructed as a three phase full sine wave driving circuit, and the signal supplied from the position fine control input terminal is added to the phase advance instruction amount, and thereby, the positioning characteristics are made better by increasing the torque inclination near the stop point of the rotor, and the continual position fine control of the rotor, and the continual position fine control of the rotor stop position can be executed. These effects are obtained in addition to the advantages of the first embodiment.

In both the first embodiment and the second embodiment, any kind of brushless motor can be applied to the apparatus.

Several embodiments of the mechanical part of the motor are described.

Figure 14:
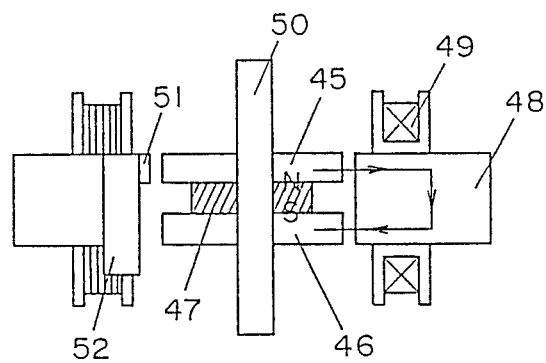
FIGS. 14(a) and 14(b) are respectively a vertical sectional view and a plane view showing a construction of a main part of a third embodiment of the present invention.
Figure 14:
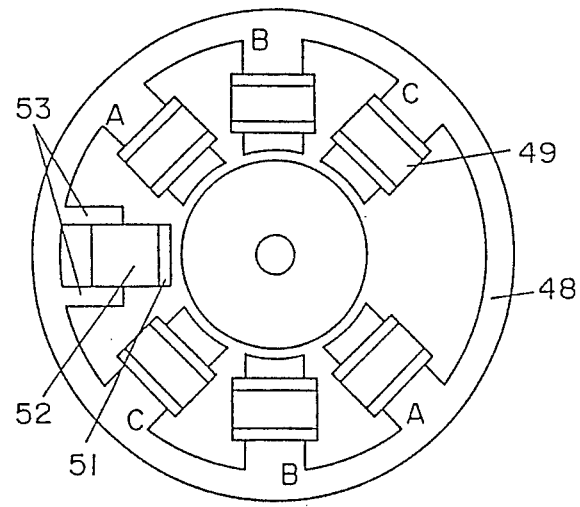

FIG. 14 shows the construction of a third embodiment of the present invention. FIG. 14 shows a first rotor core 45, a second rotor core 46, a permanent magnet 47, a stator core 48, a coil 49, a shaft 50, a position sensor 51 comprising a magnetic reluctance element, a sensor supporting base 52, and a protrusion 53 provided on the stator core 48 for supporting and positioning the sensor supporting base 52. The electric circuitry is common with the first and second embodiments.

The operation of the third embodiment will now be described with regard to the brushless motor constructed as mentioned above. Though the magnetic teeth are not shown in FIG. 15, the magnetic teeth are formed on the external circumferences of the rotor core 45, 46 and on the inner circumferences of the stator magnetic pole teeth grooves A, B, C, $\overline{A}$, $\overline{B}$, $\overline{C}$, the rotor core 45 and the rotor core 46 are shifted by ½ of the magnetic pole teeth pitch with respect to each other, having the permanent magnet 47 inbetween.

The flow of the magnetic flux of the rotor magnet is as shown by the solid line arrows.

Next the magnetic teeth groups A, B and C of the stator core 48 are shifted by ⅓ of the magnetic pole teeth pitch with respect to the rotor magnetic pole teeth. That is, B is shifted by ⅓ pitch with respect to A, and C is shifted by ⅓ pitch with respect to B.

Further, a coil 49 is wound around those magnetic pole teeth. The coil magnetic flux generates torque by offsetting and strengthening the magnetic flux of the permanent magnet 47.

Figure 15:
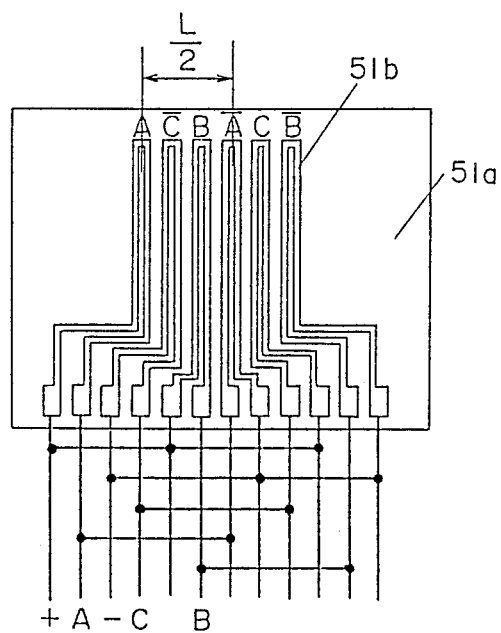
FIGS. 15(a) and 15(b) are respectively a diagram and an equivalent circuit diagram of a sensor used in the third embodiment.
Figure 15:
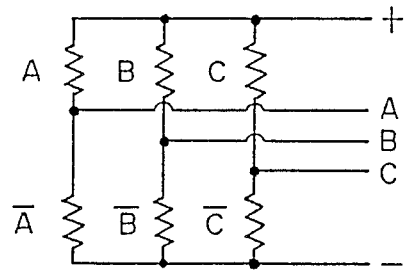
Figure 16:
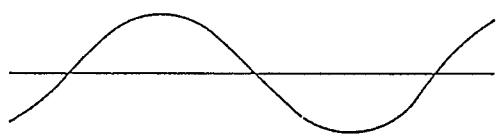
FIG. 16 is a waveform of the sensor output of the third embodiment, Thrust forces of each phase are as follows.
Figure 16:
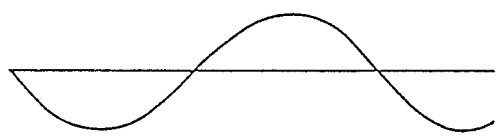
Figure 16:
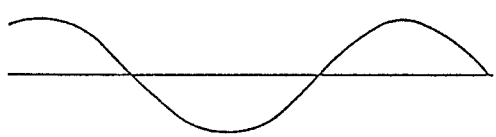

With regard to the position sensor, the sensor output is three phase, since the motor of the present embodiment is three phase. FIG. 15 shows the construction of the position sensor 51. The magnetic reluctance element 51b, which is evaporated on a glass substrate 51a, and characteristics such that the resistance value varies corresponding to the strength of the magnetic field applied thereto. With regard to only one phase, two magnetic reluctance elements are disposed and shifted by ½ of each magnetic pole teeth pitch. By wire it as shown in FIG. 15(a), the equivalent circuit of (b) is made, and the obtained wave form is as shown in FIG. 16. Since the rotor cores 45 and 46 have the permanent magnet 47 in between, there is a magnetic field, which is modulated by the magnetic pole teeth of the rotor core, on the external circumference of the rotor core and it serves as a bias magnet for the reluctance element 51b and on output wave form of approximate sine wave shape is obtained.

Incidentally, the mounting position of the sensor has a relation to the stator magnetic pole teeth. Therefore, in order to position the position sensor 51 and the sensor supporting base 52, a protrusion or a notch is formed on the stator core 49.

A fourth embodiment of the present invention will now be described as follows. Since the electric circuit is also similar to the first and second embodiments, a description thereof is omitted, and only the mechanical part of the motor is described.

Figure 17:
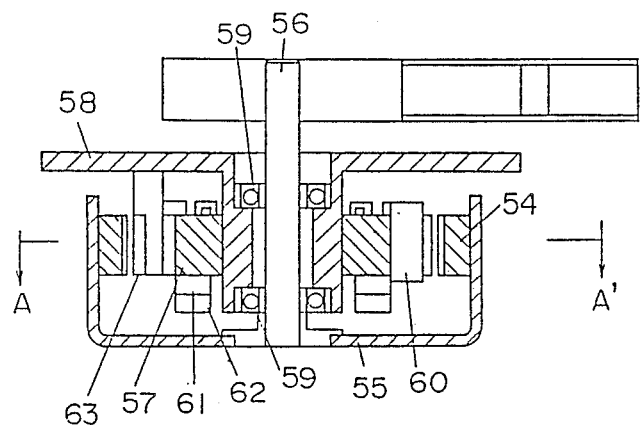
Figure 18:
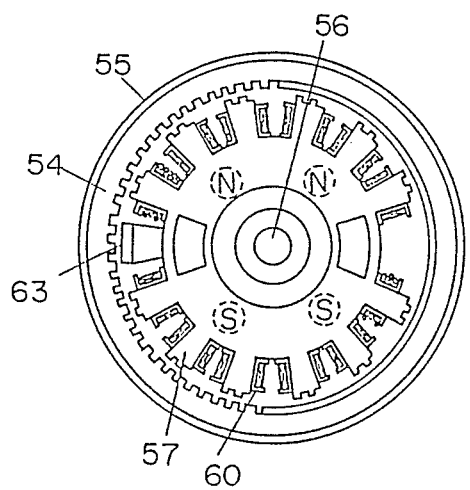

FIG. 17 is a sectional view of the mechanical part of the present embodiment, FIG. 18 is a sectional view taken along line A—A of FIG. 17. The rotor core 54 having teeth formed on the inner circumference at a uniform angle pitch is provided to a shaft 56 with an external frame 55 and is rotatably supported by a bearing apparatus 59 provided to an inner frame 58 supporting the stator core 57. On the other hand, the coil 60 is wound around the stator core 57 and is provided with a permanent magnet 61 and a yoke 62 and is fixed to the inner frame 58 with the bearing apparatus 59. Further, the position sensor 63 is disposed on the external circumference circular arc of the stator core 57 and is mounted on the inner frame 58. The position sensor 63 is for detecting the concavities and the convexities of the rotor magnetic pole and uses the magnetic reluctance element and the optical detecting means etc. As shown in the sectional view of FIG. 18, the stator core 57 has six magnetic pole teeth groups, which are different 54, as a fundamental unit. Of course, the magnetic pole teeth groups of plural fundamental units can be disposed in the same stator core. In the present embodiment, the disposition is magnetic pole teeth groups of two fundamental units.

In addition to the above-mentioned embodiments, the conventional brushless motors can be supplied with the motor mechanical part of the present invention. That is, the brushless motor may have a rotor comprising a magnet which is multipole-magnetized, or the brushless motor may have a rotor comprising a magnet which is multipole-magnetized on a disk.

Further, though in the embodiments a three phase coil brushless motor is used, a similar effect can be obtained in other two or more phase brushless motors.

According to the present invention, a small size brushless motor which has a precise positioning function and rotates at high speed in synchronism with the external step advance pulse, is realized.

We claim:

1. A brushless motor comprising:
   a rotor having magnetic pole teeth;
   a stator having a plurality of coils, each facing said rotor across a gap;
   bearing means for rotatably supporting said rotor;
   position sensor means, mounted on said stator, for detecting variations of a position of said rotor and converting said variations into an electric signal, indicative thereof to issue a substantially sine wave-shaped polyphase positional signal;
   velocity detecting means for converting said positional signal to a velocity signal indicative of a rate of change of said positional signal;
   electronic switching means coupled to receive a step advance instruction signal from external to said motor, for selecting one phase of said polyphase positional signal, corresponding to said step advance instruction signal;
   phase advancing means for advancing a phase of said positional signal, using a sum of said velocity signal and said selected positional signal as a phase advance amount; and
   driving circuit means for exciting said plurality of coils, using the phase-advanced positional signal.

2. A brushless motor in accordance with claim 1, wherein
   said rotor comprises a circular magnetic body having said magnetic pole teeth disposed on a circumference of said circle at a predetermined pitch therearound;
   said rotor comprises a stator core having a magnetic pole teeth group on a surface facing said rotor, a permanent magnet provided on said stator core, said plurality of coils being wound around said stator core; and
   said position sensor means includes means for detecting concavities and convexities of said rotor magnetic pole, teeth and said electric signal.

3. A brushless motor in accordance with claim 1, wherein
   said rotor comprises a permanent magnet, magnetic bodies which sandwich said permanent magnet in between, and said magnetic pole teeth disposed on circumferences of said magnetic bodies;
   said stator comprises a stator core having a magnetic pole teeth group on a surface facing said rotor, said plural coils being wound on said stator core, said position sensor means including means for detecting concavities and convexities of said rotor magnetic pole teeth, and for converting said detected convexities and concavities into said electric signal.

4. A brushless motor in accordance with claim 1, wherein said driving circuit means comprises a sine wave fullwave driving circuit for advancing a phase of said positional signal by using a sum of said velocity signal, the selected positional signal and said instruction signal, as a phase advance amount.

5. A motor as in claim 1 wherein said position sensor means has a plurality of phase components, one for each of said poly phases, and wherein a center of one element is ¼ pitch shifted with respect to others.

* * * * *